Jan. 1, 1952 R. R. WATERMAN 2,580,866
FUEL REGULATING AND SAFETY SHUTOFF VALVE
Filed Aug. 12, 1947 2 SHEETS—SHEET 1

INVENTOR
R. R. Waterman
BY
ATTORNEYS

INVENTOR
R. R. Waterman

Patented Jan. 1, 1952

2,580,866

UNITED STATES PATENT OFFICE 2,580,866

FUEL REGULATING AND SAFETY SHUTOFF VALVE

Russell R. Waterman, Lodi, Calif.

Application August 12, 1947, Serial No. 768,185

2 Claims. (Cl. 50—5)

This invention relates to a pressure controlled fluid regulating valve, and especially to one designed to regulate the fuel flow to the burner of a boiler, and which is controlled by the pressure generated within the boiler by such burner.

A major object of this invention is to provide a valve of the above character which, while closing when an excessively high pressure is within the boiler, also closes automatically in the event of failure of pressure within the boiler, as when the latter is dry, and in such a manner that the fuel pressure cannot re-open the valve. The valve must then be manually re-opened—which, of course, would not be done by the operator until proper conditions within the boiler have been restored.

Another object of the invention is to provide a valve of this type so constructed that the flow of fuel through the valve under ordinary working conditions will be automatically controlled within very close limits relative to changes in the operating pressure in the boiler and which actuates the valve.

A further object of the invention is to produce a practical device and one which will be exceedingly effective for the purpose for which it is designed.

These objects are accomplished by means of such structure and relative arrangement of parts as will fully appear by a perusal of the following specification and claims.

Figure 1:
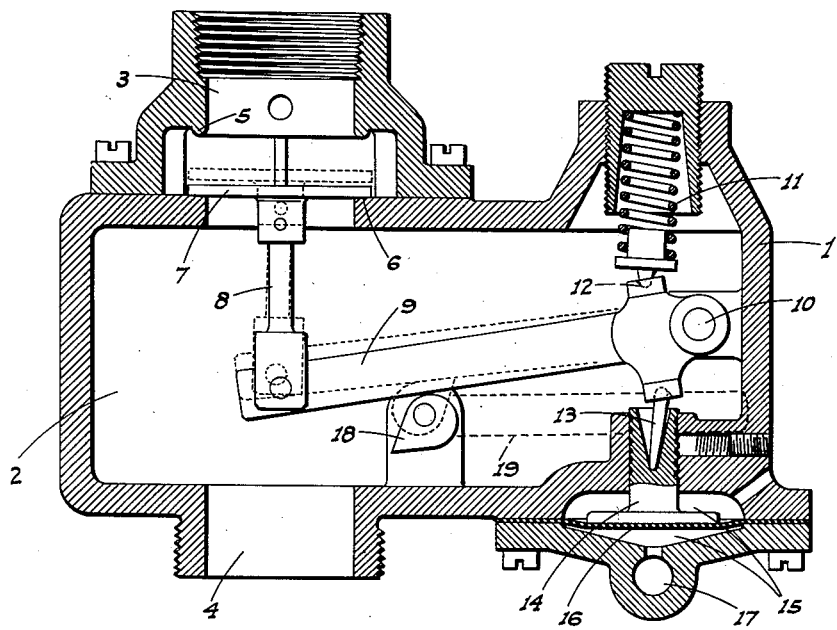
Figure 1 is a sectional elevation of my improved regulating valve of a type suitable for gas fuel, and shown as closed due to lack of pressure within the boiler.
Figure 2:
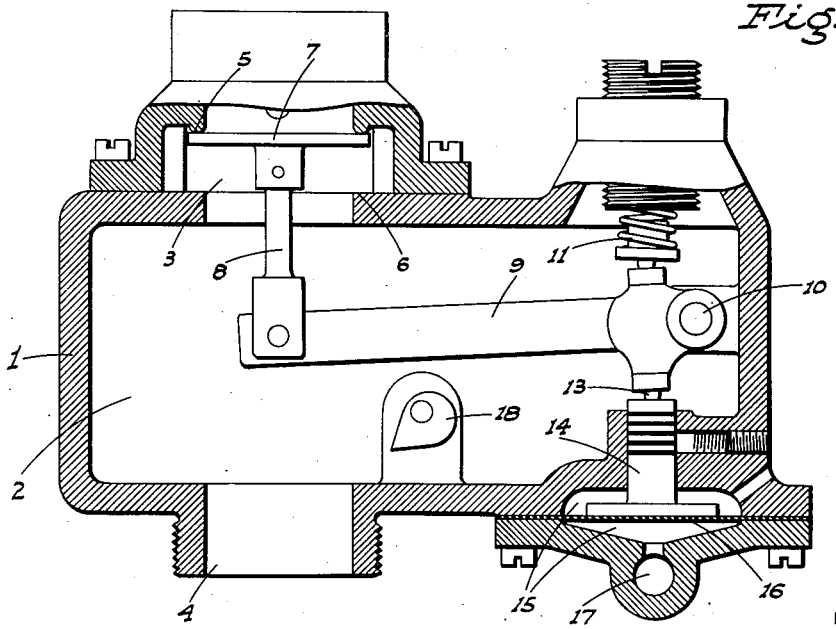
Figure 2 is a similar view showing the valve as closed due to excessively high pressure conditions.

Referring now more particularly to the characters of reference on the drawings, especially at present to Figs. 1 and 2, the regulator comprises an elongated hollow body 1 of generally rectangular form and defining an enclosed chamber 2. A gas intake passage 3 connects with the chamber 2 adjacent one end of the body; an outlet passage 4 leading from said chamber preferably opposite the passage 3. The gas entering passage 3 flows across the adjacent portion of chamber 2 to reach the outlet 4, so that said portion of the chamber actually forms a part of the gas flow passage as a whole.

The passage 3 is formed intermediate its ends with a pair of facing outer and inner valve seats 5 and 6, respectively, between which a valve disc 7, to engage either seat, is movable. The valve disc is connected to a depending arm 8 which is pivoted on one end of a lever 9. This lever is pivoted at its opposite end, as at 10, in the body adjacent the end thereof furthest from the passage 3.

A compression spring 11 in the body engages the lever with a swivel connection 12 at a point relatively close to the pivot 10 and acts on said lever in a direction to close the valve disc 7 against the seat 6.

Applied against the lever, opposite the spring and correspondingly close to the pivot 10, is a pin 13 swivelly engaging said lever and a stem 14 slidably in the body. This stem, at its outer end, projects into a chamber 15 formed on the body but outwardly of chamber 2, said chamber 15 having a diaphragm 16 extending across the same and engaging the outer end of the stem. The chamber 15, inwardly of the diaphragm, is open to atmosphere, but outwardly of said diaphragm the chamber has a port 17 adapted for connection with a conduit leading from the steam dome or pressure area of a boiler in the conventional manner.

Pressure against the outer face of the diaphragm, therefore, acts on the lever in opposition to the spring 11 and tends to close the valve disc against the seat 5. The points of engagement of the spring 11 and pin 13 with the lever are so disposed relative to the positions of the anchored ends of said spring and pin with respect to the pivot of the lever that the leverage effect of the pin 13 on the lever increases as the pressure increases and the valve moves from seat 6 toward seat 5; while the leverage effect of the spring on the lever decreases with such movement of the lever and vice versa. When the valve is fully open between the seats 5 and 6 the opposed pressures acting on the lever are substantially balanced, giving very precise control of the valve, and a correspondingly sensitive control of the gas flow with any relatively slight normal fluctuations in the working pressure of the steam within the boiler.

Should the pressure get excessively high so as to overcome the decreasing effectiveness of the spring action, the valve disc will close against the seat 5 until the pressure has dropped sufficiently to enable the spring to again open the valve. If, however, the pressure drops to an excessively low point, the increasingly effective spring action then acts on the lever so that the valve will close against seat 6, thus again shutting off the flow of gas to the burner. Since the valve cannot then open of itself until the boiler pressure again builds up (which cannot, of course, occur until the burner again functions) I provide a manual means to open the valve. This means is in the form of a cam 18 disposed within the chamber 2 under, but not attached to the lever 9, and connected to an operating handle 19 outside the body. The cam is positioned so that upon turning of the handle the lever will be swung in a direction in opposition to the spring 11 or so as to move the valve disc off the seat, so as to enable the gas flow to pass from passage 3 to outlet 4 and thence to the burner.

Figure 4:
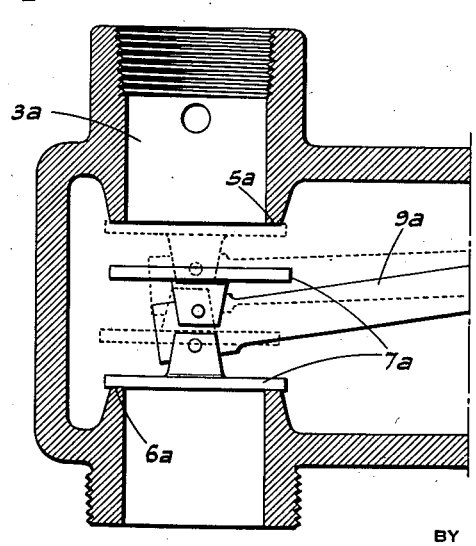
Figure 4 is a fragmentary section of a gas regulating valve, showing a dual-head valve unit.

In Fig. 4 I employ a pair of valve discs 7a on the end of lever 9a facing away from each other and adapted to alternately engage seats 5a and 6a formed in facing relation on the inner ends of the inlet and outlet passages 3a and 4a, respectively. The opening and closing action of the valve, however, is obviously the same as previously described.

Figure 5:
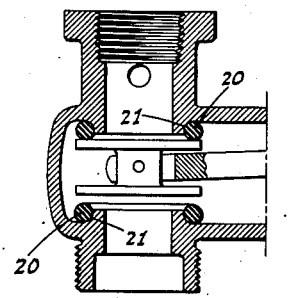
Figure 5 is a fragmentary sectional elevation showing a special type of replaceable valve seat ring usable with the structure of either Fig. 1 or 4.

In both the above described types of valve, the valve seats are formed directly in the metal of the body. I may, however, use special resilient rubber rings 20 of circular cross section to form these seats, as shown in Fig. 5, the body metal being annularly grooved, as at 21, to retain the rings and allow them to project away from the periphery of the metal faces, as shown. Such rings provide an improved seat for the valve discs and are capable of easy replacement when necessary without the need of any machining.

Figure 3:
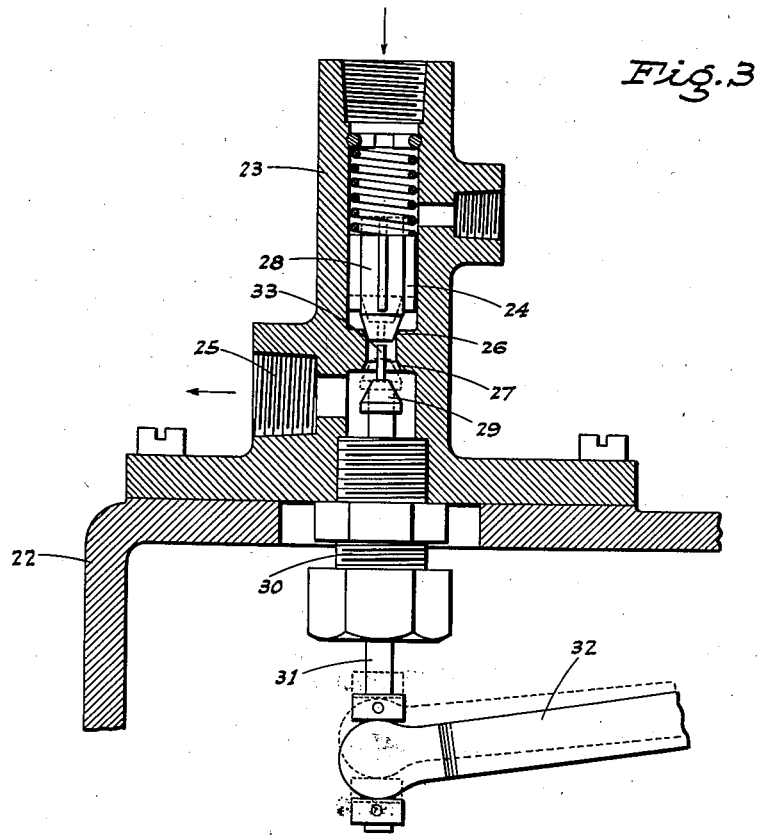
Figure 3 is a fragmentary sectional elevation showing the invention as applied to a fuel oil feed valve.

In Fig. 3 the inventive concept of a high and low pressure shut-off regulator is shown as applied to an oil fuel control. In this case the body 22 need merely be a support for the valve and its operating mechanism, since there is no flow of oil therethrough. The oil controlled valve is mounted on said body and comprises an elongated valve casing 23 provided with a passage 24 therethrough, which at its outer end is adapted for connection with a fuel intake conduit. At the opposite end of the passage the casing is formed with a lateral outlet 25 adapted for connection to a conduit leading to the burner. Intermediate its ends the passage 24 is formed with a pair of oppositely facing valve seats 26 and 27, the former facing the intake. The seat 26 is engaged by a spring pressed plunger valve 28, while the seat 27 is adapted for engagement by a taper valve 29 mounted on the end of a stem 30 projecting through a packing gland 31 where it is connected to the control lever 32. The lever extends substantially at right angles to the stem, and is controlled in its movement in the same manner as described in connection with the structure of Fig. 1. The valve 29 has an extension 33 projecting toward the valve 28 but clear of the same when the valve 29 is fully open and the valve 28 is fully closed.

When the pressure control lever 32 is affected by normal operating pressure, the valve 28 is engaged by the extension 33 and lifted, so that both valves are opened. When the pressure becomes excessive the valve 29 closes against the seat 27, the valve 28, of course, remaining open. When the pressure drops below normal the valve 29 opens until the extension 33 pulls away from the valve 28 allowing the latter to close and thus preventing any flow of fuel to the outlet 25 until the valve 28 is again opened by the manual lifting of the lever 32 as in the first described type.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. A fuel feed regulating valve comprising a fluid passage conduit having an inlet and an outlet, a double acting valve in said conduit, such valve including a valve stem, a lever pivoted at one end to a support, the free end of the lever being pivoted to the valve stem, a spring acting against one side of the lever, a second fluid conduit, a pressure responsive diaphragm in said second named conduit, a pin on the diaphragm acting against the other side of said lever, a swivel connection between the spring and the lever, and a swivel connection between the pin and the lever.

2. A fuel feed regulating valve comprising a body forming a fuel passage conduit having an inlet and an outlet, means forming opposed valve seats in said conduit intermediate its ends, a valve unit movable between the seats to alternately close the same, a lever in the body connected at one end to the valve unit to move the same and having a pivot mounted at its other end, a pressure actuated diaphragm mounted on the body beyond one edge of the lever and having an axially movable stem, means forming a swivel connection between the stem and said edge of the lever relatively near but offset from the pivot and on the same side thereof as the stem, the connection of said swivel connection with the lever lying at a point thereon on a radial line at an obtuse angle to the axial line of the stem whereby as pressure against the diaphragm turns the lever in a direction to move the valve unit from one seat toward the other seat said angle will decrease and the effective leverage action on the lever will be increased with such turning; a helical spring beyond the other edge of the lever seated at its outer end in the body and acting in opposition to the diaphragm, and a swivel connection between the inner end of the spring and said other edge of the lever relatively near the pivot and on the same side thereof as the spring; the connection of the last named swivel connection with the lever lying at a point thereon on a radial line at an obtuse angle to the axial line of the spring whereby as the lever is turned under diaphragm pressure and the spring becomes compressed, said last named obtuse angle will be increased and the effective leverage action of the spring on the lever will be reduced.

RUSSELL R. WATERMAN.

REFERENCES CITED

The following references are of record in the file of this patent:

UNITED STATES PATENTS

| Number | Name | Date |
|---|---|---|
| 324,905 | Westinghouse | Aug. 25, 1885 |
| 374,485 | McGann | Dec. 6, 1887 |
| 405,830 | Dally | June 25, 1889 |
| 417,134 | Bell | Dec. 10, 1889 |
| 854,340 | Dixon | May 21, 1907 |
| 979,837 | Farmer | Dec. 27, 1910 |
| 1,764,193 | Bruehl | June 17, 1930 |
| 2,381,484 | Blank | Aug. 7, 1945 |

FOREIGN PATENTS

| Number | Country | Date |
|---|---|---|
| 529,408 | Great Britain | Nov. 20, 1907 |
| 536,870 | Great Britain | Aug. 18, 1939 |